(12) United States Patent
Moon

(10) Patent No.: US 12,103,486 B1
(45) Date of Patent: Oct. 1, 2024

(54) AIRBAG CUSHION AND SIDE AIRBAG DEVICE HAVING THE SAME

(71) Applicant: HYUNDAI MOBIS CO., LTD., Seoul (KR)

(72) Inventor: Geon Woong Moon, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/495,058

(22) Filed: Oct. 26, 2023

(30) Foreign Application Priority Data

Apr. 3, 2023 (KR) .................. 10-2023-0043502

(51) Int. Cl.
*B60R 21/233* (2006.01)
*B60R 21/231* (2011.01)

(52) U.S. Cl.
CPC .......... *B60R 21/233* (2013.01); *B60R 21/231* (2013.01); *B60R 21/23138* (2013.01)

(58) Field of Classification Search
CPC ............... B60R 21/233; B60R 21/231; B60R 21/23138; B60R 21/237; B60R 2021/23146
See application file for complete search history.

(56) References Cited

U.S. PATENT DOCUMENTS

| | | | | |
|---|---|---|---|---|
| 5,584,508 A * | 12/1996 | Maruyama | ............. | B60R 21/231 280/739 |
| 7,207,594 B2 * | 4/2007 | Igawa | .................. | B60R 21/231 280/730.1 |
| 8,186,708 B2 * | 5/2012 | Zhou | ..................... | B60R 21/231 280/730.2 |
| 9,873,399 B2 * | 1/2018 | Goto | ..................... | B60R 21/235 |
| 10,640,074 B2 * | 5/2020 | Jo | .......................... | B60R 21/207 |
| 10,759,375 B2 * | 9/2020 | Suk | ..................... | B60R 21/23138 |
| 11,220,233 B2 * | 1/2022 | Cho | ..................... | B60R 21/235 |
| 11,225,218 B2 * | 1/2022 | Kobayashi | ......... | B60R 21/2338 |
| 11,491,946 B2 * | 11/2022 | Azuma | ............. | B60R 21/23138 |
| 11,661,026 B2 * | 5/2023 | Jo | ..................... | B60R 21/23138 280/730.2 |
| 2014/0159355 A1 * | 6/2014 | Fujiwara | ............... | B60R 21/231 280/730.2 |
| 2021/0094502 A1 * | 4/2021 | Jo | ..................... | B60R 21/23138 |

FOREIGN PATENT DOCUMENTS

CN         113815559 A    * 12/2021

OTHER PUBLICATIONS

Computer generated English translation of CN 113815559 (Year: 2024).*

* cited by examiner

*Primary Examiner* — Amy R Weisberg
*Assistant Examiner* — Tiffany L Webb
(74) *Attorney, Agent, or Firm* — NSIP Law

(57) ABSTRACT

An airbag cushion includes a first panel symmetrically connected to a second panel with respect to a central reference line. The first panel includes a protruding chamber that expands and protrudes toward an occupant by gas flowing into an internal space formed between the first panel and the second panel, and the protruding chamber is configured so that a partial area of the first panel is folded to form an overlapped folded structure and the folded structure unfolds and expands as the internal space expands by the gas.

7 Claims, 6 Drawing Sheets

I-I'

AIRBAG CUSHION AND SIDE AIRBAG DEVICE HAVING THE SAME

CROSS-REFERENCE TO RELATED APPLICATION

This application claims priority to and the benefit of Korean Patent Application No. 10-2023-0043502, filed on Apr. 3, 2023, in the Korean Intellectual Property Office, the entire disclosure of which is incorporated herein by reference for all purposes.

BACKGROUND

1. Field of the Invention

The present invention relates to an airbag cushion and a side airbag device, and more particularly, to an airbag cushion and a side airbag device installed on the seatback side of the driver's seat.

2. Discussion of Related Art

In general, when a car accident occurs, an airbag device protects an occupant by rapidly ejecting gas and rapidly expanding a deflated airbag cushion in response to a signal from a collision sensor. As airbag devices, there are a driver airbag device mounted on the steering wheel, a passenger airbag device mounted on the upper side of the glove box, curtain airbag devices mounted along the roof rail, and side airbag devices mounted on the side of a seat.

Among them, the side airbag is a device in which an airbag cushion expands and deploys forward from the side of the seatback to protect the side from the chest to the buttocks of an occupant. In particular, a center side airbag device is placed between the driver's seat occupant and the passenger seat occupant in the event of a side collision of a vehicle to protect the occupants from colliding with each other.

The conventional side airbag device is unfolded and bends a cushion along a tether connected at the upper portion of the cushion to prevent the head of the driver's seat occupant and the head of the passenger seat occupant from colliding with each other, and the lower portion of the cushion is supported by a console, forming the conceptual structure for restraining the occupants.

However, there is a problem in that the upper volume of the cushion is not significantly different from the lower volume, resulting in insufficient protection against collision between two occupants. In addition, in vehicles without a center console, a structural problem occurs in which the cushion does not receive sufficient support and moves toward the side seat, resulting in a problem of not protecting the occupants safely.

Therefore, there is a need to solve this problem.

SUMMARY OF THE INVENTION

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

The present invention is directed to providing an airbag cushion and a side airbag device that protect occupants more effectively by having a structure in which the upper volume of a deployed cushion is expanded and ensures sufficient support even when the cushion is deployed from the seatback.

The object of the present invention is not limited to the problems mentioned above, and other problems not mentioned will be clearly understood by those skilled in the art from the description below.

In one general aspect, an airbag cushion includes a first panel symmetrically connected to a second panel with respect to a central reference line. The first panel includes a protruding chamber that expands and protrudes toward an occupant by gas flowing into an internal space formed between the first panel and the second panel, and the protruding chamber is configured so that a partial area of the first panel is folded to form an overlapped folded structure and the folded structure unfolds and expands as the internal space expands by the gas.

The airbag cushion may be formed by sewing edges of the first panel and the second panel that are folded and overlapped along the central reference line in a state in which the folded structure is formed.

The airbag cushion may include a non-expandable area in which the first panel and the second panel are bonded to each other and which is not expanded by the gas, and the folded structure may be located above the non-expandable area.

The first panel may be longer than the second panel by a surplus area, and the folded structure may be formed by folding the surplus area.

The first panel may be folded along a first folding line and a second folding line perpendicular to the central reference line, and the first folding line and the second folding line may be disposed between a bottom line of the folded structure and an upper line of the folded structure, and a distance between the first folding line and the second folding line may be the same as a distance between the first folding line and the bottom line and a distance between the second folding line and the upper line.

The folding direction along the first folding line and the folding direction along the second folding line may be opposite to each other.

The first panel and the second panel may be made of a flexible fabric material.

In another general aspect, a side airbag device includes an inflator that generates gas, and an airbag cushion inflated by the gas, wherein the airbag cushion includes a first panel symmetrically connected to a second panel with respect to a central reference line. The first panel includes a protruding chamber that expands and protrudes toward an occupant by gas flowing into an internal space formed between the first panel and the second panel, and the protruding chamber is configured so that a partial area of the first panel is folded to form an overlapped folded structure and the folded structure unfolds and expands as the internal space expands by the gas.

Other features and aspects will be apparent from the following detailed description, the drawings, and the claims.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
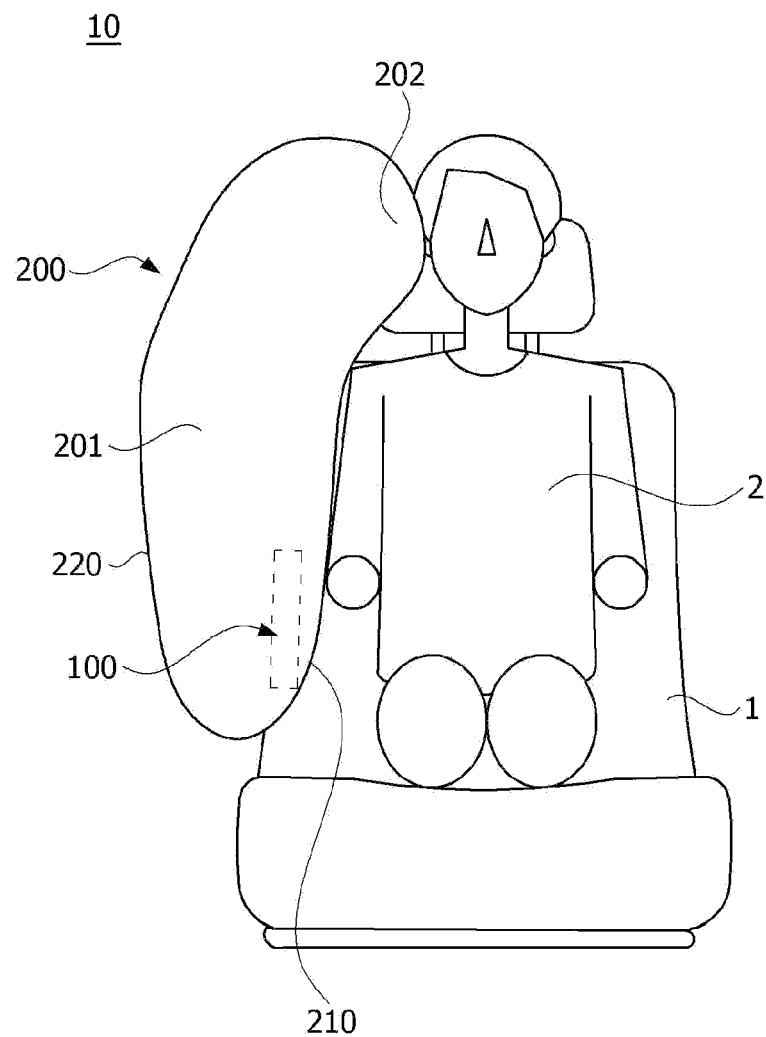
FIG. 1 is a diagram schematically illustrating an inflated airbag cushion in a side airbag device according to an embodiment of the present invention.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, embodiments will be described in detail with reference to the accompanying drawings, wherein identical or corresponding components will be assigned the same reference numerals regardless of drawing numbers, and duplicate descriptions thereof will be omitted.

Figure 2:
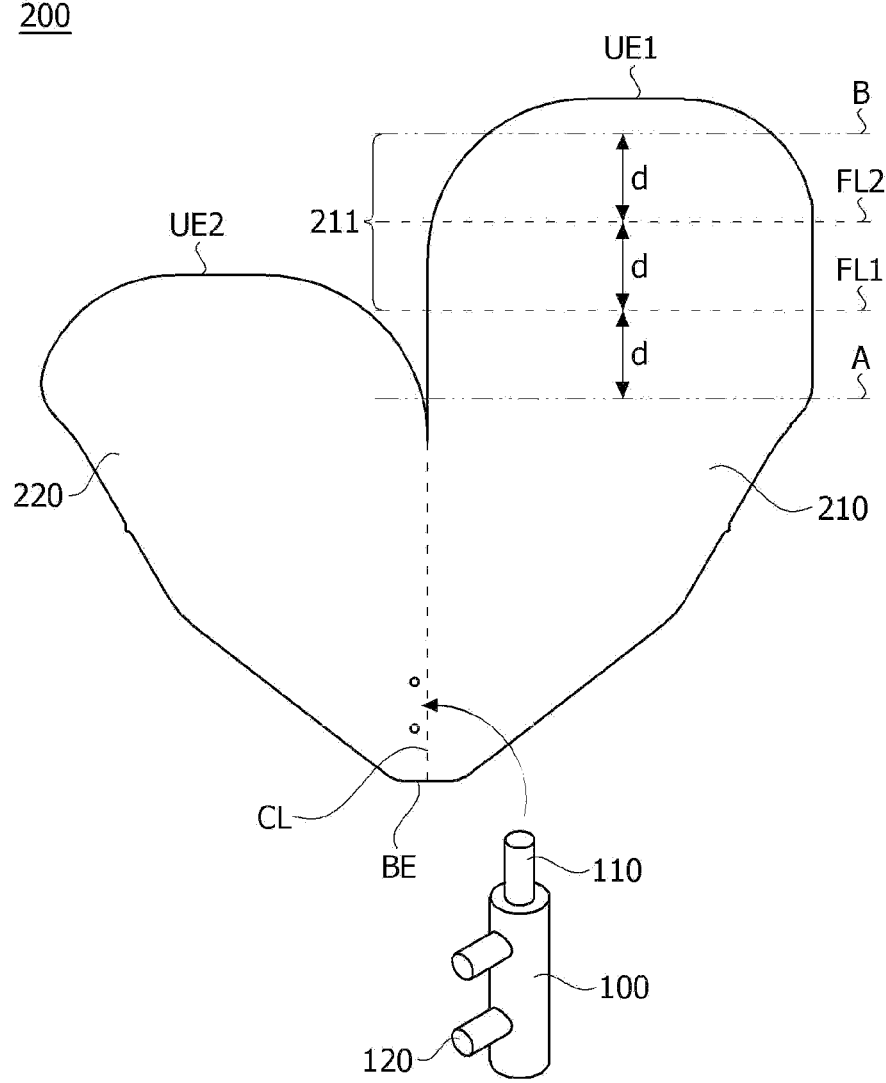
FIG. 2 is a diagram schematically illustrating the deployment of the first and second panels constituting the airbag cushion in the side airbag device according to an embodiment of the present invention.
Figure 3:
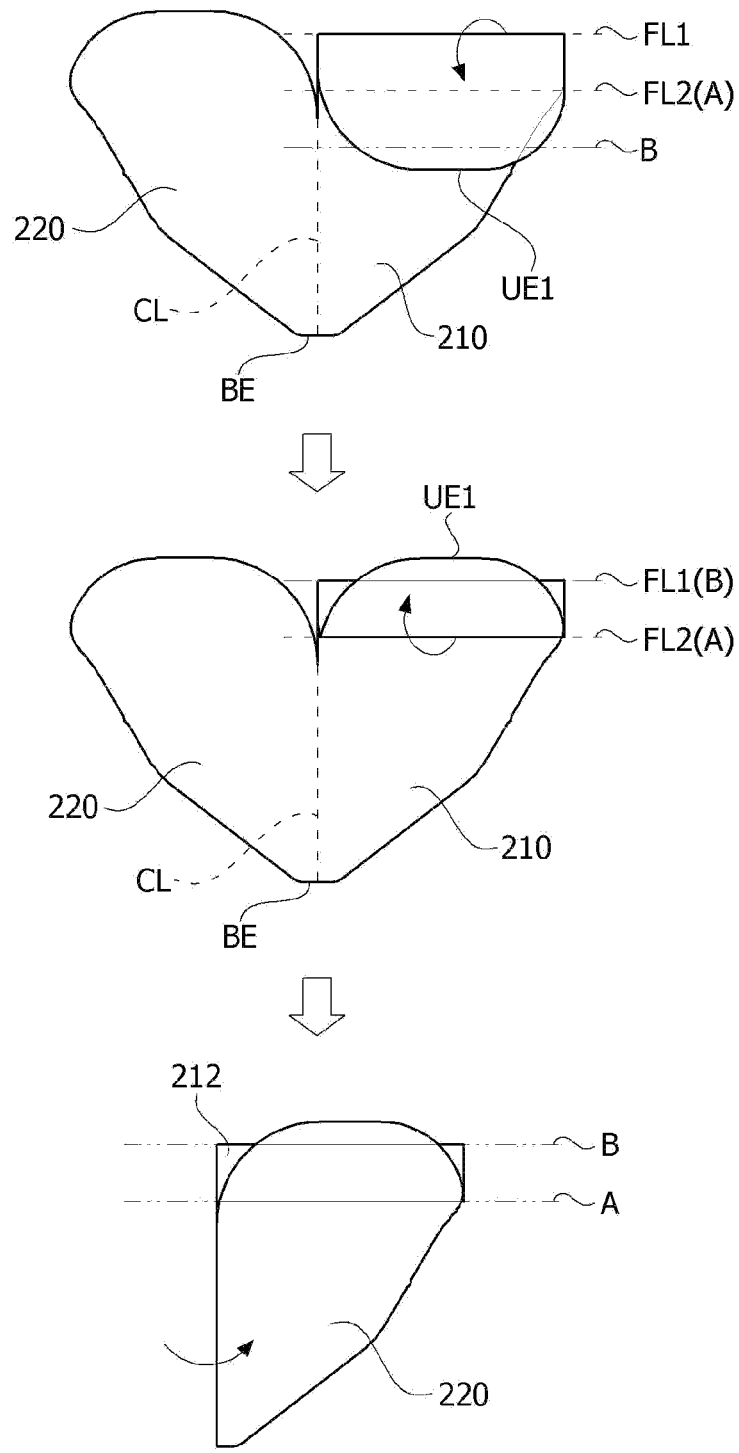
FIG. 3 is a diagram schematically illustrating a process of forming a folded structure by folding the surplus area in the first panel of FIG. 2.
Figure 4:
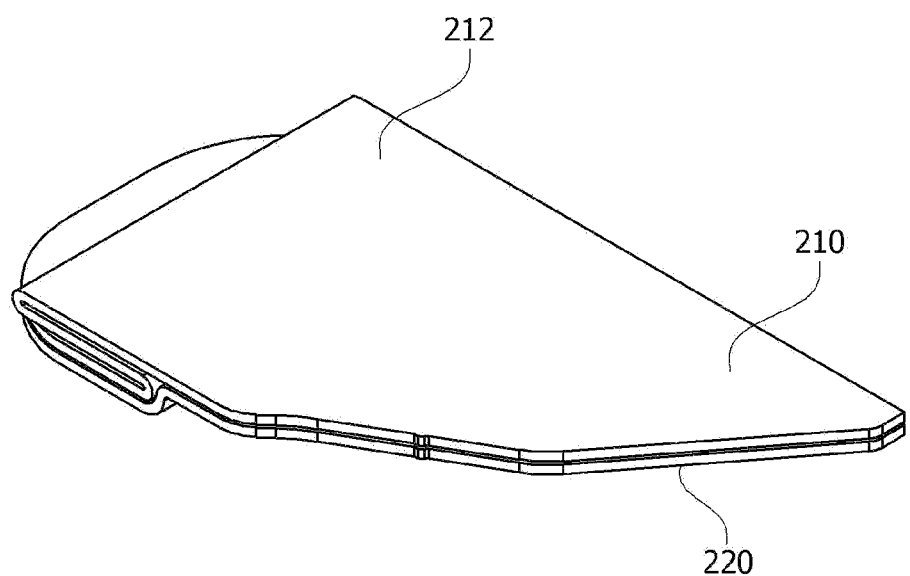
FIG. 4 is a diagram schematically illustrating a state in which the first panel formed with a folded structure overlaps the second panel.
Figure 5:
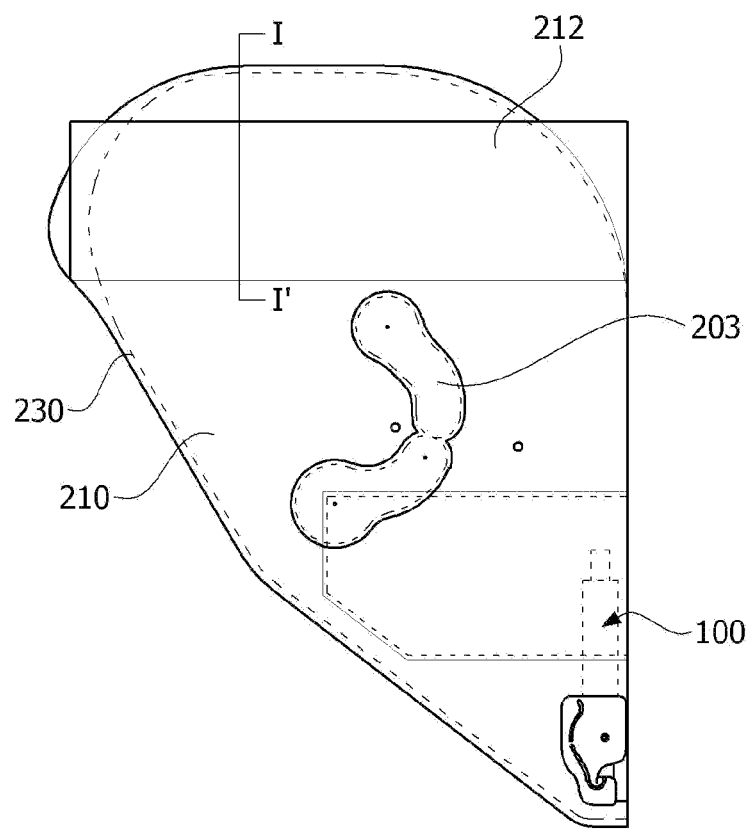
FIG. 5 is a diagram schematically illustrating a state in which the edges of the first panel and the second panel of FIG. 4 are sewn.
Figure 6:
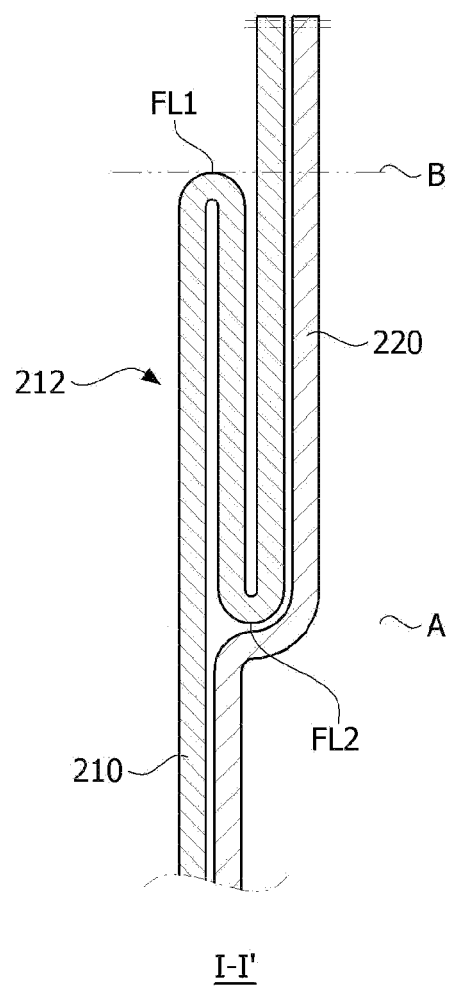
FIG. 6 is a diagram schematically illustrating a cross section along line I-I' in FIG. 5.

FIG. 1 is a diagram schematically showing an inflated airbag cushion in a side airbag device according to an embodiment of the present invention, FIG. 2 is a diagram schematically showing the deployment of the first panel and second panels constituting the airbag cushion in the side airbag device according to an embodiment of the present invention, FIG. 3 is a diagram schematically showing a process of forming a folded structure by folding the surplus area in the first panel of FIG. 2, FIG. 4 is a diagram schematically showing a state in which the first panel formed with a folded structure overlaps the second panel, FIG. 5 is a diagram schematically showing a state in which the edges of the first panel and the second panel of FIG. 4 are sewn, and FIG. 6 is a diagram schematically showing a cross section along line I-I' in FIG. 5.

A side airbag device 10 according to an embodiment of the present invention may be mounted on the side of a driver's seatback 1 of a car to protect an occupant 2 in the event of a collision. In this case, the side of the seatback 1 on which the side airbag device 10 is mounted may be positioned toward the passenger seat (not shown). In addition, the side airbag device 10 may be a center side airbag device.

Referring to the drawings, the side airbag device 10 according to an embodiment of the present invention may include an inflator 100 that generates gas, and an airbag cushion 200 that expands and unfolds by gas.

The inflator 100 may be configured to generate gas according to a signal from an airbag control unit (ACU, not shown) when a car crash occurs.

The inflator 100 may be formed in a substantially round bar shape, and may have a gas generator and an ignition device built therein.

The inflator 100 may be provided in a cylindrical shape with an injection port 110 for injecting gas at one end. Additionally, studs 120 for installation on the vehicle body or seatback frame may be provided.

The airbag cushion 200 is inflated by the gas injected from the inflator 100, is deployed toward the front of the vehicle, and is disposed in the side direction of the occupant 2 to protect the side of the occupant 2. For example, the airbag cushion 200 is disposed between the driver's seat occupant 2 and the passenger seat occupant (not shown), thereby protecting the occupants by preventing collisions between the occupants.

Referring to the drawing, the airbag cushion 200 may include a first panel 210 facing the driver's seat and a second panel 220 facing the passenger seat.

The airbag cushion 200 has an internal space 201 formed between the first panel 210 and the second panel 220 when the first panel 210 and the second panel 220 are bonded to each other, and may be configured so that the internal space 201 expands due to inflowing gas.

In an embodiment, the first panel 210 and the second panel 220 may be made of a flexible fabric material. Alternatively, it may be made of a synthetic fiber material, but the material is not limited thereto.

The first panel 210 and the second panel 220 may be provided as a single panel structure connected to each other in left and right symmetry with respect to a central reference line CL. Specifically, the first panel 210 and the second panel 220 share a bottom surface BE, and upper surfaces UE1 and UE2 of the first panel 210 and the second panel 220 may be configured to be separated from each other. In this case, the upper surface UE1 of the first panel 210 may be located further away from the bottom surface BE than the upper surface UE2 of the second panel 220. That is, the first panel 210 may be formed to be relatively longer than the second panel 220 by as much as a surplus area 211.

The first panel 210 may be provided with a protruding chamber 202 that expands and protrudes toward the occupant 2 by gas flowing into the internal space 201 formed between the first panel 210 and the second panel 220.

The protruding chamber 202 may be formed by folding a partial area of the first panel 210 to form an overlapped folded structure 212. That is, the surplus area 211 of the first panel 210 is folded to form the folded structure 212, and as the internal space 201 is expanded by gas, the folded structure 212 unfolds and expands to form the protruding chamber 202.

Specifically, the first panel 210 may be folded along a first folding line FL1 and a second folding line FL2, which are substantially perpendicular to the reference line CL.

The first folding line FL1 and the second folding line FL2 may be disposed between a bottom line A corresponding to the bottom of the folded structure 212 and an upper line B corresponding to the top of the folded structure 212 when the folded structure 212 is formed. In this case, the distance d between the first folding line FL1 and the second folding line FL2 is the same as the distance d between the first folding line FL1 and the bottom line A, and the distance d between the second folding line FL2 and the upper line B.

The folding direction along the first folding line and the folding direction along the second folding line may be opposite to each other.

As shown in FIGS. 3 and 4, the upper surface UE1 of the first panel 210 is folded downward along the first folding line FL1 so that it faces the bottom surface BE, and the upper surface UE1 of the first panel 210 is folded upward along the second folding line FL2 so that it faces opposite the bottom surface BE. Accordingly, the first folding line FL1 is disposed at a position corresponding to the upper line B and the second folding line FL2 is disposed at a position corresponding to the bottom line A to form a folded structure 212 folded in a zigzag shape.

Also, as shown in FIG. 5, in a state in which the surplus area 211 is folded to form the folded structure 212, the edges of the first panel 210 and the second panel 220 that are folded and overlapped along the reference line CL are sewn, and thus a airbag cushion 200 joined along the seam line 230 is completed.

The inflator 100 may be mounted on the first panel 210 or the second panel 220 before the first panel 210 and the second panel 220 are folded along the reference line CL. Accordingly, the inflator 100 can be placed in the internal space 201 when the airbag cushion 200 is completed.

Meanwhile, the airbag cushion 200 may have a non-expandable area 203 that does not expand due to gas by bonding the first panel 210 and the second panel 220 to each other. The non-expandable area 203 may be provided in approximately the central area of the airbag cushion 200 and may limit the expanded thickness of the internal space 201 expanded by gas.

The folded structure is located above the non-expandable area 203. Accordingly, when the airbag cushion 200 is inflated, it is inflated to a set thickness by the non-expandable area 203, and the upper portion is inflated to a greater thickness by the protrusion chamber 202, which expands as the folded structure 212 unfolds. Therefore, the airbag cushion 200 forms an asymmetric inflated structure in which a lower expanded thickness and an upper expanded thickness are different.

In this way, the expanded thickness of the upper portion is larger than that of the lower portion, so that an occupant's head can be more effectively restrained and protected. That is, not only does it effectively prevent a collision between occupants when there are occupants in both the driver's seat and the passenger seat, but it also effectively protects the occupants by sufficiently restricting the movement of the occupant's head even when there is only the occupant in the driver's seat.

The present invention can provide an airbag cushion and a side airbag device that protect occupants more effectively by having a structure in which the upper volume of a deployed cushion is expanded and ensures sufficient support even when the cushion is deployed from the seatback.

The effects of the present invention are not limited to the effects mentioned above, and other effects not mentioned will be clearly understood by those skilled in the art from the description of the claims.

Although the present invention has been described above with reference to embodiments, it should be understood that those skilled in the art can modify the present invention in various ways without departing from the spirit and scope of the present invention as set forth in the claims below. Further, the differences related to these modifications and changes should be construed as being included in the scope of the present invention as defined in the appended claims.

What is claimed is:
1. An airbag cushion comprising:
   a first panel symmetrically connected to a second panel with respect to a central reference line, the first panel being configured to be longer than the second panel by a surplus area,
   wherein the first panel comprises a protruding chamber that is configured to expand and protrude toward an occupant by gas flowing into an internal space formed between the first panel and the second panel, and
   the protruding chamber is configured so that a partial area of the first panel is folded to form an overlapped folded structure and the folded structure unfolds and expands as the internal space expands by the gas, and the folded structure is formed by folding the surplus area, wherein the surplus area is provided at an upper surface of the first panel and located to be higher than an upper surface of the second panel, and wherein, when the airbag is expanded, the airbag cushion is configured to have a structure where an upper part being bent towards a passenger's head, as the protruding chamber on the upper surface expands in a structure that is protruding toward the passenger's head.

2. The airbag cushion of claim 1, edges of the first panel and the second panel are folded and overlapped along the central reference line and sewn in a state in which the folded structure is formed.

3. The airbag cushion of claim 1, further comprising a non-expandable area in which the first panel and the second panel are bonded to each other and which is not expanded by the gas, wherein the folded structure is located above the non-expandable area.

4. The airbag cushion of claim 1, wherein
the first panel is folded along a first folding line and a second folding line perpendicular to the central reference line; and
the first folding line and the second folding line are disposed between a bottom line of the folded structure and an upper line of the folded structure, and a distance between the first folding line and the second folding line is the same as a distance between the first folding line and the bottom line and a distance between the second folding line and the upper line.

5. The airbag cushion of claim 4, wherein a folding direction along the first folding line and a folding direction along the second folding line are opposite to each other.

6. The airbag cushion of claim 1, wherein the first panel and the second panel are comprised of a flexible fabric material.

7. A side airbag device comprising:
an inflator configured to generate gas; and
an airbag cushion configured to be inflated by the gas,
wherein the airbag cushion includes a first panel symmetrically connected to a second panel with respect to a central reference line, the first panel being configured to be longer than the second panel by a surplus area,
the first panel comprises a protruding chamber that is configured to expand and protrude toward an occupant by the gas flowing into an internal space formed between the first panel and the second panel, and
the protruding chamber is configured so that a partial area of the first panel is folded to form an overlapped folded structure, and the folded structure unfolds and expands as the internal space expands by the gas, and the folded structure is formed by folding the surplus area,
wherein the surplus area is provided at an upper surface of the first panel and located to be higher than an upper surface of the second panel, and
wherein, when the airbag is expanded, the airbag cushion is configured to have a structure where an upper part being bent towards a passenger's head, as the protruding chamber on the upper surface expands in a structure that is protruding toward the passenger's head.

* * * * *